April 28, 1931.    A. C. KERWIN    1,802,560
MASONRY BOLT
Filed April 4, 1923
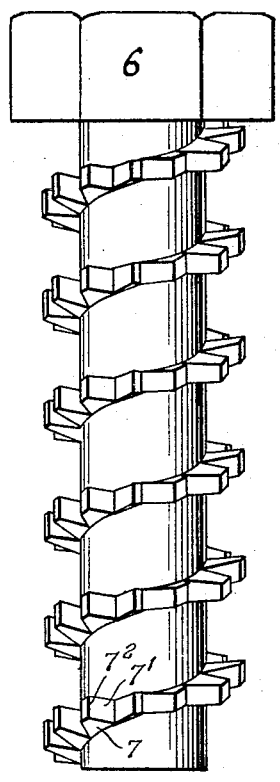
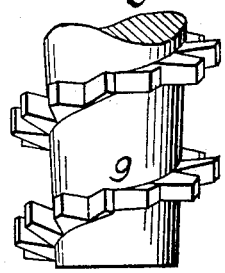
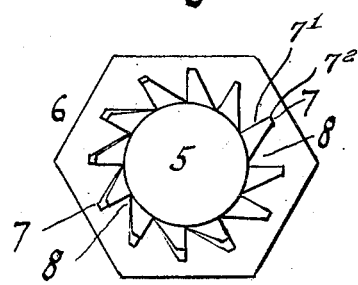
INVENTOR.
Arthur C. Kerwin
BY Hauff Harland
ATTORNEYS Patented Apr. 28, 1931

1,802,560

UNITED STATES PATENT OFFICE

ARTHUR C. KERWIN, OF NEW YORK, N. Y.

MASONRY BOLT

Application filed April 4, 1923. Serial No. 629,750.

The invention relates essentially to a bolt that will hold in masonry by screwing it directly into the substance without any additional help such as the employment of expansion shields, lead or wood plugs and other devices for gripping the bolt threads.

An object of the invention is to provide a bolt that will fasten itself into masonry when it is screwed home and will not be liable to loosen from vibration or usage.

The helix of the bolt is designed to cut a spiral groove into the masonry simply by turning it to the right until it is forced into the wall of the hole prepared for the bolt without damage to the masonry.

The invention resides more particularly in the novel combinations hereinafter described and claimed, reference being made to the accompanying drawings in which:—
Fig. 1 represents a side elevation of a bolt embodying this invention.

Fig. 2 is an inverted plan view of the same.

Fig. 3 is a side elevation of a modification showing the lower portion of a bolt.

In the drawing the numeral 5 designates a shaft or stem which is provided with an angular head 6 whereby it can be gripped by an implement to rotate the shaft. The head can be hexagonal as shown, or it could be square or oval with a notch to fit a screw driver.

A series of saw teeth 7 having acute angles 8 project from and form an integral part of the stem. The outlines of the teeth are helical surfaces inscribed about the stem in the shape of a spiral. The stem is usually of the same diameter or a trifle smaller then a hole punched in masonry for its insertion. Each tooth is so shaped that the part 7' first entering the hole is cut radially or nearly radially and the cutting point 7² is nearly a right angle.

But as indicated in Fig. 3, the stem 9 can be tapered so as to work more freely in the hole. In this construction the ratchet threaded screw is also tapered to parallel the outline of the stem and cut into the masonry after a few turns of the stem.
As indicated in Fig. 2, each tooth has a different radius so that one will project less than the other and each has a blunt end or the ends could be pointed to more readily cut a groove into the masonry. In this device each tooth is practically in the form of a triangle with a blunt top, while the front cutting edge thereof is substantially radial with the axis of the stem and the back forms an angle of about 30°.

It will be understood, that the first tooth at the beginning of the spiral will make a slight cut and each successive tooth will follow the cut made by the tooth in front and by reason of the pitch of the helical or inclination of the teeth it forces itself into the inclined groove started by the first tooth. Each tooth thus performs its function of cutting a portion of the spiral groove in the side of a hole initially formed in the stone. The first tooth to enter the masonry projects the least and each successive tooth cuts a little deeper until the spiral groove is formed in the masonry to fit the thread of the bolt. The teeth are spaced by the serrations and being close together they will provide a large number of cutting edges to bite into the wall of the hole and one tooth will follow the other in rapid succession.

I claim:—

1. A masonry bolt having a stem of practically the same diameter as a hole prepared for it in a section of masonry, and a series of triangular teeth helically located about the stem each having an acute angled back with radial forward cutting edge substantially forming a thread of relatively low pitch for cutting a spiral groove in the wall of the hole to fasten the bolt by screwing it into the hole.

2. A masonry bolt having a tapered stem of practically the same diameter as a hole prepared for it in a section of masonry, and a series of triangular teeth helically located about the stem each including an acute angled back with radial forward cutting edge and blunt outer end projecting from the stem substantially forming a thread of relatively low pitch for cutting a spiral groove in the wall of the hole to fasten the bolt by screwing it into the hole.

3. A masonry bolt having a tapered stem of practically the same diameter as a hole prepared for it in a section of masonry, and a series of triangular teeth helically located about the stem of different radius each including an acute angled back with radial forward cutting edge and blunt outer end projecting from the stem, the diameter of the thread and stem increasing as the thread advances along the stem for cutting a spiral groove in the wall of the hole to fasten the bolt by screwing it into the hole.

In testimony whereof I have hereunto set my hand.

ARTHUR C. KERWIN.